(12) United States Patent
Nishijima

(10) Patent No.: US 11,212,398 B2
(45) Date of Patent: *Dec. 28, 2021

(54) INFORMATION PROCESSING APPARATUS AND INFORMATION PROCESSING METHOD FOR DISPLAYING REGISTRATION INFORMATION OF TERMINALS ON SERVERS

(71) Applicant: TOSHIBA TEC KABUSHIKI KAISHA, Tokyo (JP)

(72) Inventor: Takeo Nishijima, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,369

(22) Filed: May 18, 2020

(65) Prior Publication Data

US 2020/0280642 A1  Sep. 3, 2020

Related U.S. Application Data

(63) Continuation of application No. 16/172,580, filed on Oct. 26, 2018, now Pat. No. 10,674,021.

(51) Int. Cl.
*H04N 1/00* (2006.01)
*H04N 1/327* (2006.01)

(52) U.S. Cl.
CPC ..... *H04N 1/00244* (2013.01); *H04N 1/00209* (2013.01); *H04N 1/00408* (2013.01); *H04N 1/32767* (2013.01); *H04N 1/32789* (2013.01)

(58) Field of Classification Search
CPC ........... H04N 1/00244; H04N 1/00209; H04N 1/00408; H04N 1/32767; H04N 1/32789
See application file for complete search history.

(56) References Cited

U.S. PATENT DOCUMENTS

| 9,319,438 B2 | 4/2016 | Inoue |
| 9,609,148 B2 | 3/2017 | Inoue |
| 2006/0072523 A1 | 4/2006 | Richardson et al. |

(Continued)

FOREIGN PATENT DOCUMENTS

JP  2012-134882 A  7/2012

OTHER PUBLICATIONS

Non-Final Office Action on U.S. Appl. No. 16/172,580 dated May 30, 2019.

(Continued)

*Primary Examiner* — Nicholas Pachol
(74) *Attorney, Agent, or Firm* — Foley & Lardner LLP

(57) ABSTRACT

According to one embodiment, an information processing apparatus includes a first display control unit and a second display control unit. The first display control unit displays a visual representation in a screen for setting a first SIP server and a second SIP server connected to an IP-FAX terminal on a display unit. The second display control unit displays a first connection state between the IP-FAX terminal and the first SIP server and a second connection state between the IP-FAX terminal and the second SIP server on the display unit, based on completion operation of setting of the first SIP server and setting of the second SIP server by a user.

16 Claims, 10 Drawing Sheets

(56) References Cited

U.S. PATENT DOCUMENTS

| | | |
|---|---|---|
| 2007/0268526 A1 | 11/2007 | Ito et al. |
| 2009/0201536 A1 | 8/2009 | Yoda et al. |
| 2010/0214593 A1 | 8/2010 | Toda |
| 2011/0196948 A1 | 8/2011 | Yamauchi |
| 2012/0044533 A1* | 2/2012 | Inoue .................... H04N 1/324 |
| | | 358/1.15 |
| 2012/0106542 A1 | 5/2012 | Inoue |
| 2013/0282820 A1* | 10/2013 | Jabri .................... H04M 3/567 |
| | | 709/204 |
| 2015/0358505 A1* | 12/2015 | Diaz .................... G06F 21/608 |
| | | 358/1.14 |

OTHER PUBLICATIONS

Notice of Allowance on U.S. Appl. No. 16/172,580 dated Jan. 29, 2020.

European Search Report issued in European Patent Application No. 19192612 dated Mar. 9, 2020 (8 pages).

\* cited by examiner

FIG. 6

```
NETWORK SETTINGS
  SIP

[SAVE]  [CANCEL]

SIP USE                                              [INVALID ▽]

┌─SIP SETTINGS──────────────────────────────────────────────────┐
    SIP TRANSMISSION TRANSPORT PROTOCOL              [UDP  ▽]
    SIP RECEPTION PORT NUMBER                        [5060    ]
    USER NAME                                        [        ]

┌─SIP SERVER SETTINGS──────────────────────────────────────┐
      ☑ USE SIP SERVER
        ALLOW TRANSMISSION WITHOUT PASSING THROUGH SIP SERVER [INVALID ▽]
        METHOD OF ACQUIRING SERVER ADDRESS           [MANUAL ▽]

┌─REGISTRAR SERVER─────────────────────────────────┐
          PRIMARY
                              [CONNECTION STATE: REGISTERED]
              SERVER IP ADDRESS              [10.151.122.77]
              PORT NUMBER                    [5060         ]
              AUTHENTICATION USER NAME       [ho ge ho ge  ]
              AUTHENTICATION PASSWORD        [●●●●●●       ]
              PASSWORD CONFIRMATION          [●●●●●●       ]

SECONDARY
                              [CONNECTION STATE: REGISTRABLE]
              SERVER IP ADDRESS              [10.151.122.60]
              PORT NUMBER                    [5060         ]
              AUTHENTICATION USER NAME       [abcdef       ]
              AUTHENTICATION PASSWORD        [●●●●●        ]
              PASSWORD CONFIRMATION          [●●●●●        ]

┌─PROXY SERVER─────────────────────────────────────┐
          PRIMARY
              SERVER IP ADDRESS              [10.151.122.77]
              PORT NUMBER                    [5060         ]
              AUTHENTICATION USER NAME       [ho ge ho ge  ]
              AUTHENTICATION PASSWORD        [●●●●●        ]
              PASSWORD CONFIRMATION          [●●●●●        ]
          SECONDARY
              SERVER IP ADDRESS              [10.151.122.60]
              PORT NUMBER                    [5060         ]
              AUTHENTICATION USER NAME       [abcdef       ]
              AUTHENTICATION PASSWORD        [●●●●●        ]
              PASSWORD CONFIRMATION          [●●●●●        ]
```

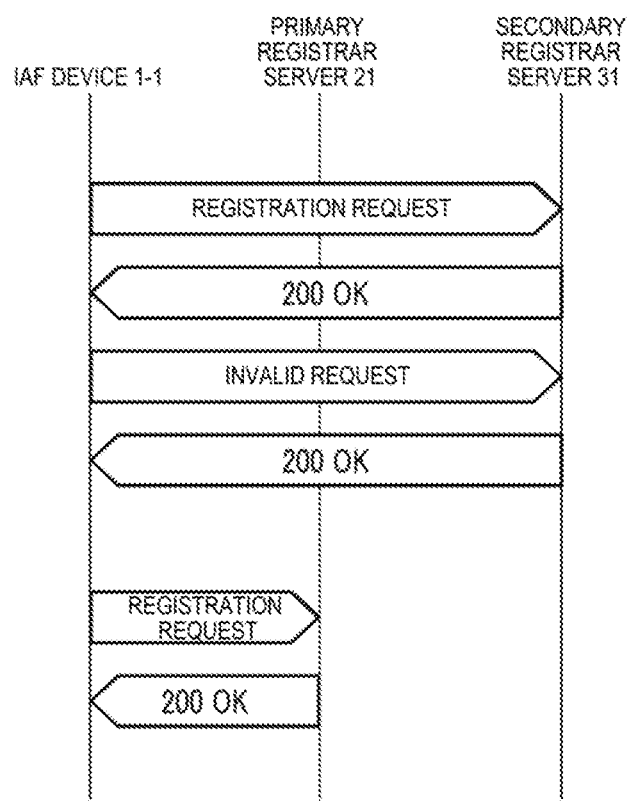

FIG. 9

| | BOTH PRIMARY SERVER AND SECONDARY SERVER ARE SET | | | ONLY PRIMARY SERVER IS SET | | ONLY SECONDARY SERVER IS SET | | BOTH SERVERS ARE NOT SET |
|---|---|---|---|---|---|---|---|---|
| | SUCCESSFUL REGISTRATION OF BOTH SERVERS | SUCCESSFUL REGISTRATION OF ONLY PRIMARY SERVER | SUCCESSFUL REGISTRATION OF ONLY SECONDARY SERVER | REGISTRATION FAILURE OF BOTH SERVERS | SUCCESSFUL REGISTRATION OF PRIMARY SERVER | REGISTRATION FAILURE OF PRIMARY SERVER | SUCCESSFUL REGISTRATION OF SECONDARY SERVER | REGISTRATION FAILURE OF SECONDARY SERVER | |
| DISPLAY OF FIRST CONNECTION STATE OF PRIMARY SERVER | REGISTERED | REGISTERED | REGISTRATION FAILURE | REGISTRATION FAILURE | REGISTERED | REGISTRATION FAILURE | (BLANK) | (BLANK) | (BLANK) |
| DISPLAY OF SECOND CONNECTION STATE OF SECONDARY SERVER | REGISTRABLE | REGISTRATION FAILURE | REGISTERED | REGISTRATION FAILURE | (BLANK) | (BLANK) | REGISTERED | REGISTRATION FAILURE | (BLANK) |

FIG. 10

```
REGISTRAR SERVER
  PRIMARY
                                CONNECTION STATE: REGISTERED
    SERVER IP ADDRESS           10.151.122.77
    PORT NUMBER                 5060
    AUTHENTICATION USER NAME    ho ge ho ge
    AUTHENTICATION PASSWORD     ●●●●●●
    PASSWORD CONFIRMATION       ●●●●●●

SECONDARY
                                CONNECTION STATE: REGISTRATION FAILURE
    SERVER IP ADDRESS           10.151.122.60
    PORT NUMBER                 5060
    AUTHENTICATION USER NAME    abcdef
    AUTHENTICATION PASSWORD     ●●●●●●
    PASSWORD CONFIRMATION       ●●●●●●
```

FIG. 11

```
REGISTRAR SERVER
  PRIMARY
                                CONNECTION STATE: REGISTRATION FAILURE
    SERVER IP ADDRESS           10.151.122.77
    PORT NUMBER                 5060
    AUTHENTICATION USER NAME    ho ge ho ge
    AUTHENTICATION PASSWORD     ●●●●●●
    PASSWORD CONFIRMATION       ●●●●●●

SECONDARY
                                CONNECTION STATE: REGISTERED
    SERVER IP ADDRESS           10.151.122.60
    PORT NUMBER                 5060
    AUTHENTICATION USER NAME    abcdef
    AUTHENTICATION PASSWORD     ●●●●●●
    PASSWORD CONFIRMATION       ●●●●●●
```

FIG. 12

REGISTRAR SERVER

PRIMARY

CONNECTION STATE: REGISTRATION FAILURE

- SERVER IP ADDRESS: 10.151.122.77
- PORT NUMBER: 5060
- AUTHENTICATION USER NAME: ho ge ho ge
- AUTHENTICATION PASSWORD: ●●●●●●
- PASSWORD CONFIRMATION: ●●●●●●

SECONDARY

CONNECTION STATE: REGISTRATION FAILURE

- SERVER IP ADDRESS: 10.151.122.60
- PORT NUMBER: 5060
- AUTHENTICATION USER NAME: abcdef
- AUTHENTICATION PASSWORD: ●●●●●●
- PASSWORD CONFIRMATION: ●●●●●●

FIG. 13

REGISTRAR SERVER

PRIMARY

CONNECTION STATE: REGISTERED

- SERVER IP ADDRESS: 10.151.122.77
- PORT NUMBER: 5060
- AUTHENTICATION USER NAME: ho ge ho ge
- AUTHENTICATION PASSWORD: ●●●●●●
- PASSWORD CONFIRMATION: ●●●●●●

SECONDARY

CONNECTION STATE: REGISTRABLE

- SERVER IP ADDRESS: 10.151.122.60
- PORT NUMBER: 5060
- AUTHENTICATION USER NAME: abcdef
- AUTHENTICATION PASSWORD: ●●●●●●
- PASSWORD CONFIRMATION: ●●●●●●

INFORMATION PROCESSING APPARATUS AND INFORMATION PROCESSING METHOD FOR DISPLAYING REGISTRATION INFORMATION OF TERMINALS ON SERVERS

CROSS-REFERENCE TO RELATED APPLICATIONS

This application is a continuation of U.S. application Ser. No. 16/172,580, filed Oct. 26, 2018, the entire contents of which are incorporated herein by reference.

FIELD

Embodiments described herein relate generally to an information processing apparatus and an information processing method related to Internet Protocol (IP)-FAX communication.

BACKGROUND

IP-FAX terminals having an IP-FAX communication function are generally used. An IP-FAX terminal sends data to another IP-FAX terminal through a session initiation protocol (SIP) server when using the IP-FAX communication function. Therefore, the IP-FAX terminal needs to be registered in an SIP server.

In a large-scale network environment, there are cases of preparing a plurality of SIP servers (for example, a primary SIP server and two secondary SIP servers). The secondary SIP server serves as a preliminary device for the primary SIP server, because, even if the primary SIP server cannot operate, IP-FAX communication can be continuously performed thorough the secondary SIP server. In this case, a user may set information on the primary SIP server and the two secondary SIP servers in the IP-FAX terminal in advance. When information on the primary SIP server is correct, registration of the IP-FAX terminal with the primary SIP server is possible. When information on the secondary SIP server is correct, registration of the IP-FAX terminal with the secondary SIP server is possible.

However, the user cannot check whether settings of information on the two SIP servers are correct when settings of the information on the two SIP servers are completed, because, even if the two SIP severs are prepared, the IP-FAX terminal cannot be simultaneously registered in the two SIP servers. When the IP-FAX terminal is successfully registered in the primary SIP server, registration with the secondary SIP server is not performed. Therefore, the user cannot check whether settings of the information on the secondary SIP server are correct or not. The user may check whether settings of the information on the two SIP servers are correct by testing data transmission and reception using each of the two SIP servers. However, the workload of an operator is large.

DESCRIPTION OF THE DRAWINGS

FIG. 6 is a diagram illustrating a setting screen;

FIG. 8 is a sequence diagram illustrating another example of a registration operation;

FIG. 9 is a diagram illustrating a combination of statuses of connection states;

FIG. 10 is a diagram illustrating an example of displaying statuses of connection states;

FIG. 11 is a diagram illustrating an example of displaying statuses of connection states;

FIG. 12 is a diagram illustrating an example of displaying statuses of connection states;

FIG. 13 is a diagram illustrating an example of displaying statuses of connection states.

DETAILED DESCRIPTION

According to an exemplary embodiment, an information processing apparatus includes a first display control unit and a second display control unit. The first display control unit displays a visual representation in a screen for setting a first SIP server and a second SIP server connected to an IP-FAX terminal on a display unit. The second display control unit displays a first connection state between the IP-FAX terminal and the first SIP server and a second connection state between the IP-FAX terminal and the second SIP server on the display unit, based on completion operation of setting of the first SIP server and setting of the second SIP server by a user.

Hereinafter, the present embodiment will be described using the drawings.

The configuration of an IP-FAX system 100 will now be described.

Figure 1:
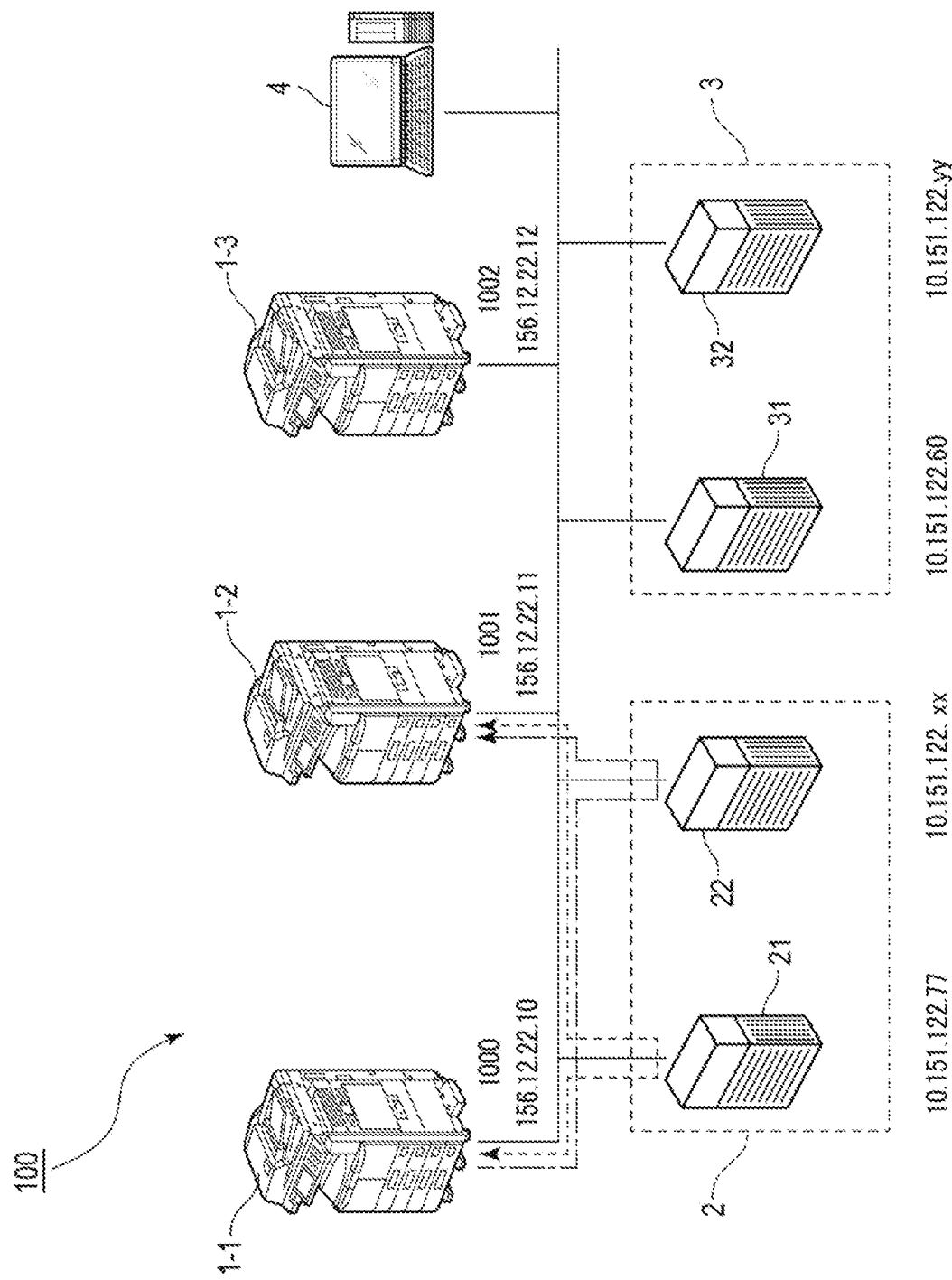
FIG. 1 is a schematic diagram illustrating a configuration of an IP-FAX system according to an embodiment.

FIG. 1 is a schematic diagram illustrating the configuration of an IP-FAX system 100. An IP address is shown near each device.

The IP-FAX system 100 realizes IP-FAX communication. The IP-FAX system 100 includes a plurality of Internet Aware FAX (IAF) devices 1-1 to 1-3, a primary SIP server 2, a secondary SIP server 3 and a personal computer 4. The devices may perform communication with each other through a network. The IP-FAX system 100 may include four or more IAF devices. The IP-FAX system 100 may include three or more SIP servers.

The IAF device 1-1 is a terminal having an IP-FAX communication function. The IAF device 1-1 may serve as IP-FAX transmitter or receiver. For example, the IAF 1-1 may be a multi-function peripheral (MFP), without being limited thereto. For example, the IAF device 1-1 transmits image data obtained from a manuscript through IP-FAX communication. The hardware configuration of the IAF device 1-1 will be described below. In addition, the IAF device 1-2 and the IAF device 1-3 are equal to the IAF device 1-1 and a description thereof will be omitted.

The primary SIP server 2 is an SIP server used for IP-FAX communication. The SIP server 2 establishes an environment in which the number of a destination is easily managed and serves as an IP-FAX exchanger. The primary SIP server 2 is preferentially used over the secondary SIP server 3. The primary SIP server 2 has a primary registrar server 21 and a primary proxy server 22.

The primary registrar server 21 is a server for registering an IAF device. In a typical example, the primary registrar server 21 registers information on an IAF device. For example, the information on the IAF device includes an SIP number and address information, without being limited thereto. For example, the SIP number may be SIP uniform resource identifier (URI). For example, the address information may be a transport address including an IP address and a port number. When the primary registrar server 21 registers the IAF device 1-1, the IAF device 1-1 may perform IP-FAX communication with another IAF device. For example, as indicated by dashed line arrow of FIG. 1, the primary registrar server 21 sends a normal response to the IAF device 1-1 based on successful registration of the IAF device 1-1. Similarly, the primary registrar server 21 sends a normal response to the IAF device 1-2 based on successful registration of the IAF device 1-2.

The primary proxy server 22 is a server for relaying IP-FAX data (packets). The primary proxy server 22 relays IP-FAX data communicated between a plurality of IAF devices registered in the primary registrar server 21. For example, as indicated by alternate long and short dash line arrow of FIG. 1, the primary registrar server 21 relays IP-FAX data from the IAF device 1-1 to the IAF device 1-2.

In addition, the primary SIP server 2 may be one server including functions of the primary registrar server 21 and the primary proxy server 22. Therefore, in the following description, the primary registrar server 21 may be appropriately replaced with the primary SIP server 2.

The secondary SIP server 3 is an SIP server used for IP-FAX communication, similarly to the primary SIP server 2. The secondary SIP server 3 has a secondary registrar server 31 and a secondary proxy server 32.

The secondary registrar server 31 is a server for registering an IAF device, similarly to the primary registrar server 21. When the secondary registrar server 31 registers the IAF device 1-1, the IAF device 1-1 may perform IP-FAX communication with another IAF device.

The secondary proxy server 32 is a server for relaying IP-FAX data (packets), similarly to the primary proxy server 22. The secondary proxy server 32 relays IP-FAX data communicated between a plurality of IAF devices registered in the secondary registrar server 31.

In addition, the secondary SIP server 3 may be one server including functions of the secondary registrar server 31 and the secondary proxy server 32. Therefore, in the following description, the secondary registrar server 31 may be appropriately replaced with the secondary SIP server 3.

The PC 4 is a terminal for performing various settings with respect to the IAF devices 1-1 to 1-3. The PC 4 performs various settings through a network by a Web service. The PC 4 is an example of an information processing apparatus.

Figure 2:
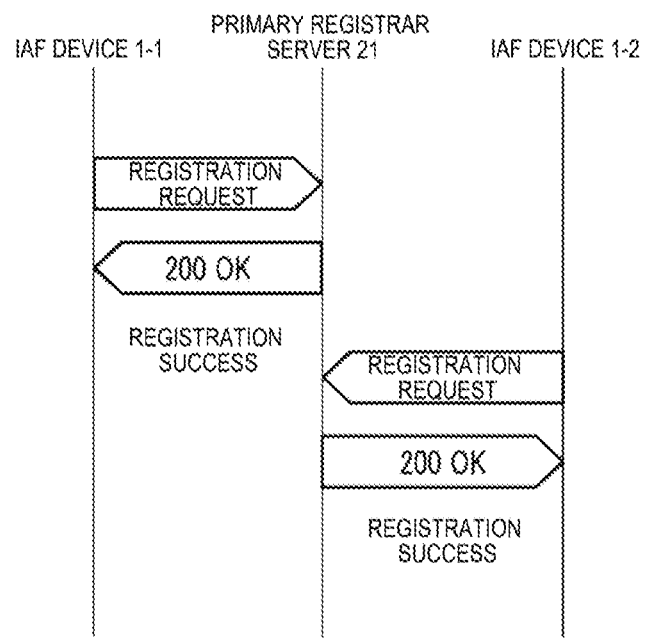
FIG. 2 is a sequence diagram illustrating a communication operation in the IP-FAX system.

FIG. 2 is a sequence diagram illustrating a communication operation in the IP-FAX system.

Here, an example of successfully registering the IAF device 1-1 and the IAF device 1-2 with the primary registrar server 21 will be described.

The IAF device 1-1 transmits a registration request to the primary registrar server 21. The registration request includes information necessary to register the IAF device 1-1. For example, the registration request may include information on the IAF device 1-1 of a requester and information on the primary registrar server 21 of a requestee. The information on the IAF device 1-1 may include information registered in the primary registrar server 21. The information on the primary registrar server 21 may include information used for authentication.

The primary registrar server 21 receives the registration request from the IAF device 1-1. The primary registrar server 21 performs authentication based on the registration request from the IAF device 1-1. The primary registrar server 21 registers the IAD device 1-1 based on successful authentication. The primary registrar server 21 transmits 200 OK to the IAD device 1-1 based on registration of the IAF device 1-1. 200 OK corresponds to a normal response.

The IAF device 1-1 receives 200 OK from the primary registrar server 21. The IAF device 1-1 recognizes successful registration of the IAF device 1-1 with the primary registrar server 21, based on 200 OK.

The IAF device 1-2 transmits a registration request to the primary registrar server 21, similarly to the IAF device 1-1. The primary registrar server 21 receives the registration request from the IAF device 1-2. The primary registrar server 21 performs authentication based on the registration request from the IAF device 1-2. The primary registrar server 21 registers the IAD device 1-2 based on successful authentication. The primary registrar server 21 transmits 200 OK to the IAD device 1-2 based on registration of the IAF device 1-2. The IAF device 1-2 receives 200 OK from the primary registrar server 21. The IAF device 1-2 recognizes successful registration of the IAF device 1-2 with the primary registrar server 21, based on 200 OK.

The primary registrar server 21 may register the IAF device 1-1 and the IAF device 1-2. The IAF device 1-1 and the IAF device 1-2 may communicate IP-FAX data through the primary proxy server 22.

The configuration of the IAF device 1-1 will be described.

Figure 3:
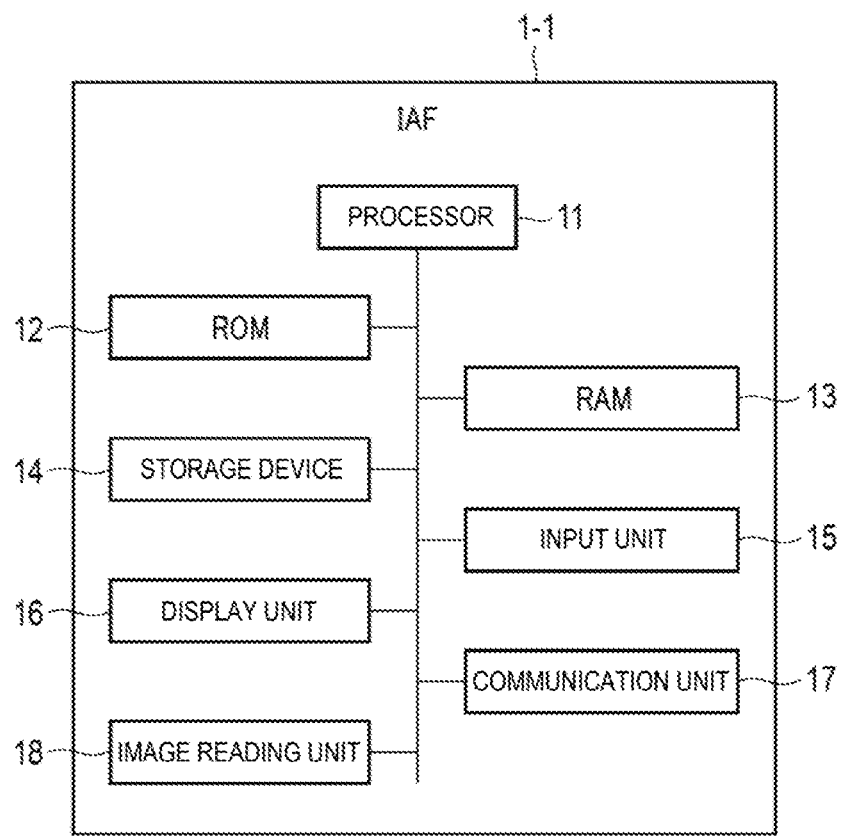
FIG. 3 is a block diagram illustrating a hardware configuration of an IAF device.

FIG. 3 is a block diagram illustrating the configuration of the IAF device 1-1.

The IAF device 1-1 includes a processor 11, a read only memory (ROM) 12, a random access memory (RAM) 13, a storage device 14, an input unit 15, a display unit 16, a communication unit 17 and an image reading unit 18.

The processor 11 is a central processing unit (CPU), for example. The processor 11 executes various processes by executing a program stored in the ROM 12 or the storage device 14.

The ROM 12 stores a program for executing various processes in the processor 11, control data, or the like. The ROM 12 is an example of a storage unit. The RAM 13 is a working memory.

The storage device 14 is a rewritable non-volatile memory. For example, the storage device 14 includes a solid state drive (SSD), a hard disk drive (HDD), or the like. The storage device 14 stores a program for executing various processes in the processor 11, control data and the like. In addition, the storage device 14 stores data collected by various processes of the processor 11. The storage device 14 is an example of the storage unit.

The input unit 15 is a user interface for receiving user operation. For example, the input unit 15 is a keyboard or a touch pad stacked on the display unit 16. In addition, the user includes various persons such as an operator, a manger and the like.

The display unit 16 is an element for displaying a variety of information. For example, the display unit 16 is a liquid crystal display.

The communication unit 17 is an interface for enabling the IAF device 1-1 to communicate with another device through a network. The communication unit 17 may be a wired communication interface or a wireless communication interface.

The image reading unit 18 is a scanner for reading a manuscript and obtaining image data from the manuscript. For example, the image reading unit 18 has an image sensor, or the like. The image sensor is an image pickup device in which pixels for converting light into electrical signals (image signals) are arranged in a line. For example, the image sensor is configured by a charge coupled device (CCD), a complementary metal oxide semiconductor (CMOS) or another image pickup device.

The configuration of the PC 4 will be described.

Figure 4:
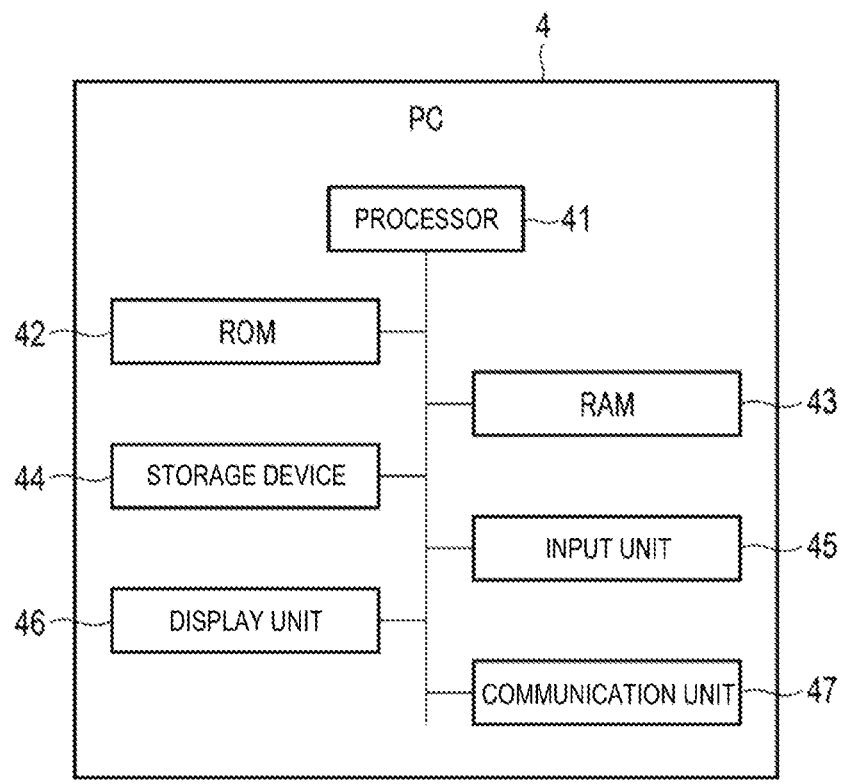
FIG. 4 is a block diagram illustrating a hardware configuration of a PC.

FIG. 4 is a block diagram illustrating the hardware configuration of the PC 4.

The PC 4 includes a processor 41, a ROM 42, a RAM 43, a storage device 44, an input unit 45, a display unit 46 and a communication unit 47.

The processor 41 is, for example a CPU. The processor 41 executes various processes by executing a program stored in the ROM 42 or the storage device 44.

The ROM 42 stores a program for executing various processes in the processor 41, control data, or the like. The ROM 42 is an example of a storage unit. The RAM 43 is a working memory.

The storage device 44 is a rewritable non-volatile memory. For example, the storage device 44 includes an SSD, a HDD, or the like. The storage device 44 stores a program for executing various processes in the processor 41, control data or the like. In addition, the storage device 44 stores data collected by various processes of the processor 41. The storage device 44 is an example of the storage unit.

The input unit 45 is a user interface for receiving user operation. For example, the input unit 45 is a keyboard or a touch pad stacked on the display unit 46.

The display unit 46 is an element for displaying a variety of information. For example, the display unit 46 is a liquid crystal display.

The communication unit 47 is an interface for enabling the PC 4 to communicate with another device through a network. The communication unit 47 may be a wired communication interface or a wireless communication interface.

Figure 5:
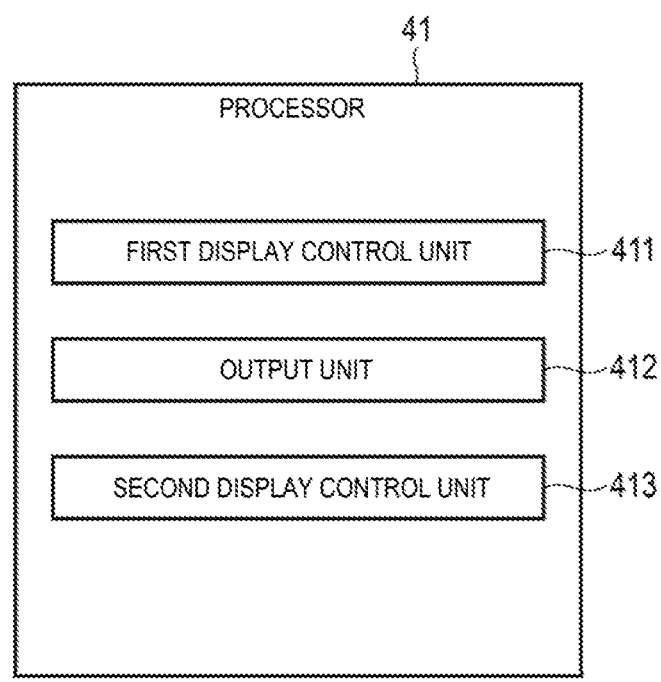
FIG. 5 is a block diagram illustrating a configuration installed in a processor of the PC.

FIG. 5 is a block diagram illustrating a configuration installed in the processor 41 of the PC 4.

The processor 41 includes a first display control unit 411, an output unit 412 and a second display control unit 413.

The first display control unit 411 displays a visual representation in a screen associated with the PC 4 (hereinafter, referred to as a setting screen) for setting the first SIP server 2 and the second SIP server 3 connected to the IAF device 1-1 on the display unit 46. The setting screen is a screen for setting the IAF device 1-1. In addition, the first display control unit 411 may perform control such that the setting screen is displayed on the display unit of an external device different from the PC 4. The example of the setting screen will be described below.

The output unit 412 outputs an operation instruction based on completion operation of the setting of the first SIP server 2 and the setting of the second SIP server 3 by the user. In a typical example, the output unit 412 outputs the operation instruction to the IAF device 1-1 through the communication unit 47. The operation instruction includes execution of first registration operation of the IAF device 1-1 with the first SIP server 2 and execution of second registration operation of the IAF device 1-1 with the second SIP server 3. The operation instruction includes information set on the setting screen. The first registration operation includes operation in which the IAF device 1-1 attempts to be registered in the primary registrar server 21. The second registration operation includes operation in which the IAF device 1-1 attempts to be registered in the secondary registrar server 31. Thus, the IAF device 1-1 executes the first registration operation of the second registration operation as described below. In addition, the IAF device 1-1 may execute the first registration operation before or after the second registration operation.

The second display control unit 413 displays a first connection state between the IAF device 1-1 and the first SIP server 2 on the display unit 46 based on completion operation. The second display control unit 413 displays the first connection state on the display unit 46 depending on whether the first registration operation of registering the IAF device 1-1 with the primary registrar server 21 is successfully executed. The second display control unit 413 displays a second connection state between the IAF device 1-1 and the second SIP server 3 on the display unit 46 based on completion operation. The second display control unit 413 displays the second connection state on the display unit 46 depending on whether the second registration operation of the IAF device 1-1 with respect to the secondary registrar server 31 is successfully executed. In addition, the second display control unit 413 may perform control such that the first connection state and the second connection state are displayed on the display unit of an external device different from the PC 4. The examples of the first connection state and the second connection state will be described below.

The setting screen will be described.

FIG. 6 is a diagram illustrating the setting screen.

The display unit 46 displays the setting screen for the IAF device 1-1. The setting screen may set two sets of SIP servers each including one registrar server and one proxy server. In addition, the setting screen may set three or more sets of SIP servers. The user sets a variety of information using the input unit 45 and presses various buttons, on the setting screen.

The setting screen may set information on the primary SIP server 2 for the IAF device 1-1. In a typical example, the setting screen may set information on the primary registrar server 21 for the IAF device 1-1. The information on the primary registrar server 21 is information for specifying the primary registrar server 21. For example, the information on the primary registrar server 21 includes an IP address, a port number, an authentication user name, an authentication password, without being limited thereto. In addition, the setting area of the information on the primary registrar server 21 includes a display area of statuses of the first connection state. The setting screen may set information on the primary proxy server 22 for the IAF device 1-1. The information on the primary proxy server 22 is information for specifying the primary proxy server 22. For example, the information on the primary proxy server 22 includes an IP address, a port number, an authentication user name, an authentication password, without being limited thereto.

The setting screen may set information of the secondary SIP server 3 for the IAF device 1-1. In a typical example, the setting screen may set information on the secondary registrar server 31 for the IAF device 1-1. The information on the secondary registrar server 31 is information for specifying the secondary registrar server 31. For example, the information on the secondary registrar server 31 includes an IP address, a port number, an authentication user name, an authentication password, without being limited thereto. In addition, the setting area of the information on the secondary registrar server 31 includes a display area of statuses of the second connection state. The setting screen may set information on the secondary proxy server 32 for the IAF device 1-1. The information on the secondary proxy server 32 is information for specifying the secondary proxy server 32. For example, the information on the secondary proxy server 32 includes an IP address, a port number, an authentication user name, an authentication password, without being limited thereto.

A save button is a button for saving (confirming) information set on the setting screen. Pressing of the save button by the user corresponds to completion operation of setting of the first SIP server and setting of the second SIP server 3 by the user. When the user presses the save button, the output unit 412 outputs the operation instruction to the IAF device 1-1 based on pressing of the save button. The IAF device 1-1 performs the first registration operation and the second registration operation.

The first registration operation and the second registration operation will be described.

Figure 7:
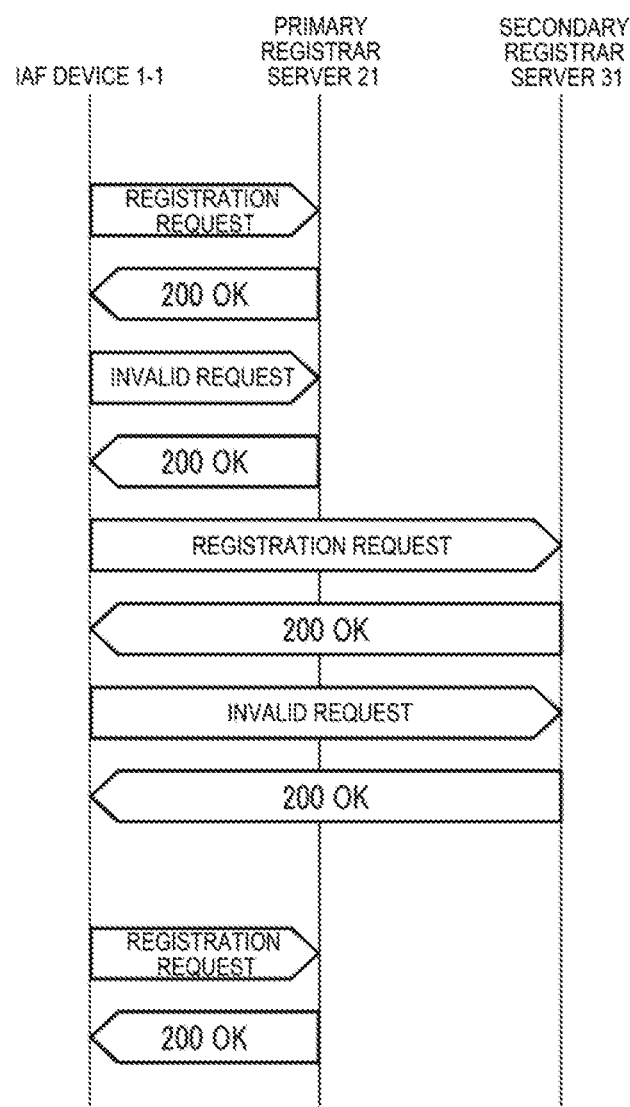
FIG. 7 is a sequence diagram illustrating an example of a registration operation by an IP-FAX terminal.

FIG. 7 is a sequence diagram illustrating an example of the first registration operation and the second registration operation by the IAF device 1-1. FIG. 7 illustrates an example in which the IAF device 1-1 performs the first registration operation before the second registration operation. Assume that the first registration operation and the second registration operation are successfully executed. The IAF device 1-1 performs the first registration operation and the second registration operation under control of the processor 11 based on the operation instruction from the PC 4. The IAF device 1-1 performs the first registration operation and the second registration operation using the information set on the setting screen.

First, the IAF device 1-1 performs the first registration operation. The IAF device 1-1 transmits a registration request to the primary registrar server 21 through the communication unit 17. The registration request may include information on the IAF device 1-1 and information on the primary registrar server 21 set on the setting screen. The primary registrar server 21 receives the registration request from the IAF device 1-1. The primary registrar server 21 performs authentication based on the registration request from the IAF device 1-1. For example, assume that there is no error in the information on the primary registrar server 21 set on the setting screen. The primary registrar server 21 may register the IAF device 1-1 based on successful authentication. Meanwhile, for example, assume that there is an error in the information on the primary registrar server 21 set on the setting screen. The primary registrar server 21 may not register the IAF device 1-1 based on authentication failure. Here, the primary registrar server 21 registers the IAF device 1-1 based on successful authentication. The primary registrar server 21 transmits 200 OK to the IAF device 1-1 based on registration of the IAF device 1-1. The IAF device 1-1 receives 200 OK from the primary registrar server 21 through the communication unit 17. The IAF device 1-1 recognizes successful registration of the IAF device 1-1 with the primary registrar server 21 based on 200 OK. Successful registration of the IAF device 1-1 with the primary registrar server 21 corresponds to success of the first registration operation. Meanwhile, registration failure of the IAF device 1-1 with the primary registrar server 21 corresponds to failure of the first registration operation.

The IAF device 1-1 transmits an invalid request to the primary registrar server 21 through the communication unit 17. The invalid request is a request to invalidate registration of the IAF device 1-1 with the primary registrar server 21. The IAF device 1-1 transmits the invalid request to the primary registrar server 21, because the IAF device 1-1 cannot be simultaneously registered in a plurality of registrar servers. The primary registrar server 21 invalidates registration of the IAF device 1-1 based on the invalid request from the IAF device 1-1. The primary registrar server 21 transmits 200 OK to the IAF device 1-1 based on invalidation of registration of the IAF device 1-1. The IAF device 1-1 receives 200 OK from the primary registrar server 21 through the communication unit 17. The IAF device 1-1 recognizes invalidation of registration of the IAF device 1-1 with the primary registrar server 21 based on 200 OK.

Next, the IAF device 1-1 performs the secondary registration operation. The IAF device 1-1 transmits a registration request to the secondary registrar server 31 through the communication unit 17. The registration request may include information on the IAF device 1-1 and information on the secondary registrar server 31 set on the setting screen. The secondary registrar server 31 receives the registration request from the IAF device 1-1. The secondary registrar server 31 performs authentication based on the registration request from the IAF device 1-1. For example, assume that there is no error in the information on the secondary registrar server 31 set on the setting screen. The secondary registrar server 31 may register the IAF device 1-1 based on successful authentication. Meanwhile, for example, assume that there is an error in the information on the secondary registrar server 31 set on the setting screen. The secondary registrar server 31 may not register the IAF device 1-1 based on authentication failure. Here, the secondary registrar server 31 registers the IAF device 1-1 based on successful authentication. The secondary registrar server 31 transmits 200 OK to the IAF device 1-1 based on registration of the IAF device 1-1. The IAF device 1-1 receives 200 OK from the secondary registrar server 31 through the communication unit 17. The IAF device 1-1 recognizes successful registration of the IAF device 1-1 with secondary registrar server 31 based on 200 OK. Successful registration of the IAF device 1-1 with the secondary registrar server 31 corresponds to success of the second registration operation. Meanwhile, failure of registration of the IAF device 1-1 with the secondary registrar server 31 corresponds to failure of the secondary registration operation.

The IAF device 1-1 transmits an invalid request to the secondary registrar server 31 through the communication unit 17, because the primary SIP server 2 is more preferentially used than the secondary SIP server 3. The secondary registrar server 31 invalidates registration of the IAF device 1-1 based on the invalid request from the IAF device 1-1. The secondary registrar server 31 transmits 200 OK to the IAF device 1-1 based on invalidation of registration of the IAF device 1-1. The IAF device 1-1 receives 200 OK from the secondary registrar server through the communication unit 17. The IAF device 1-1 recognizes invalidation of registration of the IAF device 1-1 with the secondary registrar server 31 based on 200 OK.

Next, the IAF device 1-1 transmits the registration request to the primary registrar server 21 again through the communication unit 17. The primary registrar server 21 receives the registration request from the IAF device 1-1. The primary registrar server 21 performs authentication based on the registration request from the IAF device 1-1. The primary registrar server 21 registers the IAF device 1-1 based on successful authentication. The primary registrar server 21 transmits 200 OK to the IAF device 1-1 based on registration of the IAF device 1-1. The IAF device 1-1 receives 200 OK from the primary registrar server 21 through the communication unit 17. The IAF device 1-1 recognizes successful registration of the IAF device 1-1 with the primary registrar server 21 based on 200 OK.

The IAF device 1-1 is registered in the primary registrar server 21 and thus may perform IP-FAX communication with another IAF device through the primary SIP server 2.

The IAF device 1-1 transmits information indicating whether the first registration operation is successfully executed to the PC 4. The processor 41 determines whether there is an error in the information on the primary registrar server 21 set on the setting screen, depending on whether the first registration operation is successfully executed. When the first registration operation is successfully executed, the processor 41 determines that there is no error in the information on the primary registrar server 21 set on the setting screen. When the first registration operation fails, the processor 41 determines that there is an error in the information on the primary registrar server 21 set on the setting screen.

The IAF device 1-1 transmits information indicating whether the second registration operation is successfully executed to the PC 4. The processor 41 determines whether there is an error in the information on the secondary registrar server 31 set on the setting screen, depending on whether the second registration operation is successfully executed. When the second registration operation is successfully executed, the processor 41 determines that there is no error in the information on the secondary registrar server 31 set on the setting screen. When the second registration operation fails, the processor 41 determines that there is an error in the information on the secondary registrar server 31 set on the setting screen.

FIG. 8 is a sequence diagram illustrating another example of the first registration operation and the second registration operation by the IP-FAX terminal 1-1. FIG. 8 illustrates an example in which the IAF device 1-1 performs the first registration operation after the second registration operation. Assume that the first registration operation and the second registration operation are successfully executed. The IAF device 1-1 performs the first registration operation and the second registration operation under control of the processor 11 based on the operation instruction from the PC 4. The IAF device 1-1 performs the first registration operation and the second registration operation using the information set on the setting screen.

First, the IAF device 1-1 performs the secondary registration operation. The IAF device 1-1 transmits a registration request to the secondary registrar server 31 through the communication unit 17. The secondary registrar server 31 receives the registration request from the IAF device 1-1. The secondary registrar server 31 performs authentication based on the registration request from the IAF device 1-1. The secondary registrar server 31 registers the IAF device 1-1 based on successful authentication. The secondary registrar server 31 transmits 200 OK to the IAF device 1-1 based on registration of the IAF device 1-1. The IAF device 1-1 receives 200 OK from the secondary registrar server 31 through the communication unit 17. The IAF device 1-1 recognizes successful registration of the IAF device 1-1 with secondary registrar server 31 based on 200 OK.

The IAF device 1-1 transmits an invalid request to the secondary registrar server 31 through the communication unit 17. The secondary registrar server 31 invalidates registration of the IAF device 1-1 based on the invalid request from the IAF device 1-1. The secondary registrar server 31 transmits 200 OK to the IAF device 1-1 based on invalidation of registration of the IAF device 1-1. The IAF device 1-1 receives 200 OK from the secondary registrar server 31 through the communication unit 17. The IAF device 1-1 recognizes invalidation of registration of the IAF device 1-1 with the secondary registrar server 31 based on 200 OK.

Next, the IAF device 1-1 performs the first registration operation. The IAF device 1-1 transmits a registration request to the primary registrar server 21 through the communication unit 17. The primary registrar server 21 receives the registration request from the IAF device 1-1. The primary registrar server 21 performs authentication based on the registration request from the IAF device 1-1. The primary registrar server 21 may register the IAF device 1-1 based on successful authentication. The primary registrar server 21 transmits 200 OK to the IAF device 1-1 based on registration of the IAF device 1-1. The IAF device 1-1 receives 200 OK from the primary registrar server 21 through the communication unit 17. The IAF device 1-1 recognizes successful registration of the IAF device 1-1 with the primary registrar server 21 based on 200 OK.

The IAF device 1-1 is registered in the primary registrar server 21 and thus may perform IP-FAX communication with another IAF device through the primary SIP server 2.

The IAF device 1-1 transmits, to the PC 4, information indicating whether the first registration operation is successfully executed. The IAF device 1-1 transmits, to the PC 4, information indicating whether the second registration operation is successfully executed.

The first connection state and the second connection state will be described.

FIG. 9 is a diagram illustrating a combination of statuses of the first connection state and the second connection state.

The second display control unit 413 determines the status of the first connection state and the second connection state based on the information set on the setting screen and whether the first registration operation and the second registration operation are successfully executed. The second display control unit 413 displays the status of the first connection state and the second connection state in a predetermined area of the setting screen. The status is any one of "registered", "registrable", "registration failure" or "(blank)".

Registered" indicates a state in which the information on the registrar server is set on the setting screen and the IAF device 1-1 is registered in the registrar server. That is, "registered" indicates a state in which the registrar server is currently registering the IAF device by successful registration operation. "Registrable" indicates a state in which the information on the registrar server is set on the setting screen and the IAF device 1-1 may be registered in the registrar server. That is, "registrable" indicates a state in which the registrar server may register the IAF device 1-1 by successful registration operation but does not currently register the IAF device 1-1. This registrar server does not currently register the IAF device 1-1 because another registrar server is currently registering the IAF device 1-1. "Registration failure" indicates a state in which setting of the registrar server is performed on the setting screen but the IAF device 1-1 cannot be registered in the registrar server. That is, "registration failure" indicates a state in which the registrar server cannot register the IAF device 1-1 due to failure of the registration operation. "(Blank)" indicates a state in which the information on the registrar server is not set on the setting screen. "(Blank)" indicates that information is not indicated.

The case where the user sets the information on the primary registrar server 21 and the information on the secondary registrar server 31 on the setting screen will be described. When the first registration operation and the second registration operation are successfully executed, the status of the first connection state is "registered". The status of the second connection state is "registrable". When the first registration operation is successfully executed and the second registration operation fails, the status of the first connection state is "registered". The status of the second connection state is "registration failure". When the first registration operation fails and the second registration operation is successfully executed, the status of the first connection state is "registration failure". The status of the second connection state is "registered". When both the first registration operation and the second registration operation fail, the status of the first connection state is "registration failure". The status of the second connection state is "registration failure".

The case where the user sets the information on the primary registrar server 21 and does not set the information on the secondary registrar server 31 on the setting screen will be described. When the first registration operation is successfully executed, the status of the first connection state is "registered". The status of the second connection state is "(blank)", because the second registration operation is not executed. When the first registration operation fails, the status of the first connection state is "registration failure". The status of the second connection state is "(blank), because the second registration operation is not executed.

The case where the user sets the information on the secondary registrar server 31 and does not set the information on the primary registrar server 21 on the setting screen will be described. When the second registration operation is successfully executed, the status of the second connection state is "registered". The status of the first connection state is "(blank)", because the first registration operation is not executed. When the second registration operation fails, the status of the second connection state is "registration failure". The status of the first connection state is "(blank), because the first registration operation is not executed.

The case where the user does not set the information on the primary registrar server 21 and the information on the secondary registrar server 31 on the setting screen will be described. The status of the first connection state is "(blank)", because the first registration operation is not executed. The status of the second connection state is "(blank)", because the second registration operation is not executed.

The user may check whether there is an error in the information set on the setting screen by checking the statuses of the first connection state and the second connection state displayed on the setting screen.

FIG. 10 is a diagram illustrating an example of displaying the statuses of the first connection state and the second connection state.

Assume that the user sets the information on the primary registrar server 21 and the information on the secondary registrar server 31 on the setting screen. Assume that the first registration operation is successfully executed and the second registration operation fails.

The second display control unit 413 displays the first connection state and the second connection state on the display unit 46 as described below based on success of the first registration operation and failure of the second registration operation. The second display control unit 413 displays the state in which the IAF device 1-1 is registered in the primary registrar server 21 on the display unit 46 as the first connection state. That is, the second display control unit 413 displays "registered" on the setting screen as the status of the first connection state. The second display control unit 413 displays the state in which the IAF device 1-1 cannot be registered in the secondary registrar server 31 on the display unit 46 as the second connection state. That is, the second display control unit 413 displays "registration failure" on the setting screen as the status of the second connection state. Therefore, the user can easily confirm that there is no error in the information on the primary registrar server 21 set on the setting screen. The user can easily confirm that there are errors in the information on the secondary registrar server 31 set on the setting screen.

FIG. 11 is a diagram illustrating an example of displaying statuses of the first connection state and the second connection state.

Assume that the user sets the information on the primary registrar server 21 and the information on the secondary registrar server 31 on the setting screen. Assume that the first registration operation fails and the second registration operation is successfully executed.

The second display control unit 413 displays the first connection state and the second connection state on the display unit 46 as described below based on failure of the first registration operation and success of the second registration operation. The second display control unit 413 displays the state in which the IAF device 1-1 cannot be registered in the primary registrar server 21 on the display unit 46 as the first connection state. That is, the second display control unit 413 displays "registration failure" on the setting screen as the status of the first connection state. The second display control unit 413 displays the state in which the IAF device 1-1 is registered in the secondary registrar server 31 on the display unit 46 as the second connection state. That is, the second display control unit 413 displays "registered" on the setting screen as the status of the second connection state. Therefore, the user can easily confirm that there are errors in the information on the primary registrar server 21 set on the setting screen. The user can easily confirm that there is no error in the information on the secondary registrar server 31 set on the setting screen.

FIG. 12 is a diagram illustrating an example of displaying statuses of the first connection state and the second connection state.

Assume that the user sets the information on the primary registrar server 21 and the information on the secondary registrar server 31 on the setting screen. Assume that the first registration operation fails and the second registration operation fails.

The second display control unit 413 displays the first connection state and the second connection state on the display unit 46 as described below based on failure of the first registration operation and failure of the second registration operation. The second display control unit 413 displays the state in which the IAF device 1-1 cannot be registered in the primary registrar server 21 on the display unit 46 as the first connection state. That is, the second display control unit 413 displays "registration failure" on the setting screen as the status of the first connection state. The second display control unit 413 displays the state in which the IAF device 1-1 cannot be registered in the secondary registrar server 31 on the display unit 46 as the second connection state. That is, the second display control unit 413 displays "registration failure" on the setting screen as the status of the second connection state. Therefore, the user can easily confirm that there are errors in the information on the primary registrar server 21 set on the setting screen. The user can easily confirm that there are errors in the information on the secondary registrar server 31 set on the setting screen.

FIG. 13 is a diagram illustrating an example of displaying statuses of the first connection state and the second connection state.

Assume that the user sets the information on the primary registrar server 21 and the information on the secondary registrar server 31 on the setting screen. Assume that the first registration operation is successfully executed and the second registration operation is successfully executed.

The second display control unit 413 displays the first connection state and the second connection state on the display unit 46 as described below based on success of the first registration operation and success of the second registration operation. The second display control unit 413 displays the state in which the IAF device 1-1 is registered in the primary registrar server 21 on the display unit 46 as the first connection state. That is, the second display control unit 413 displays "registered" on the setting screen as the status of the first connection state. The second display control unit 413 displays the state in which the IAF device 1-1 is registrable with the secondary registrar server 31 on the display unit 46 as the second connection state. That is, the second display control unit 413 displays "registrable" on the setting screen as the status of the first connection state. Therefore, the user can easily confirm that there is no error in the information on the primary registrar server 21 set on the setting screen. The user can easily confirm that there is no error in the information on the secondary registrar server 31 set on the setting screen.

Displaying the statuses of the first connection state and the second connection state in the PC 4 will be described.

Figure 14:
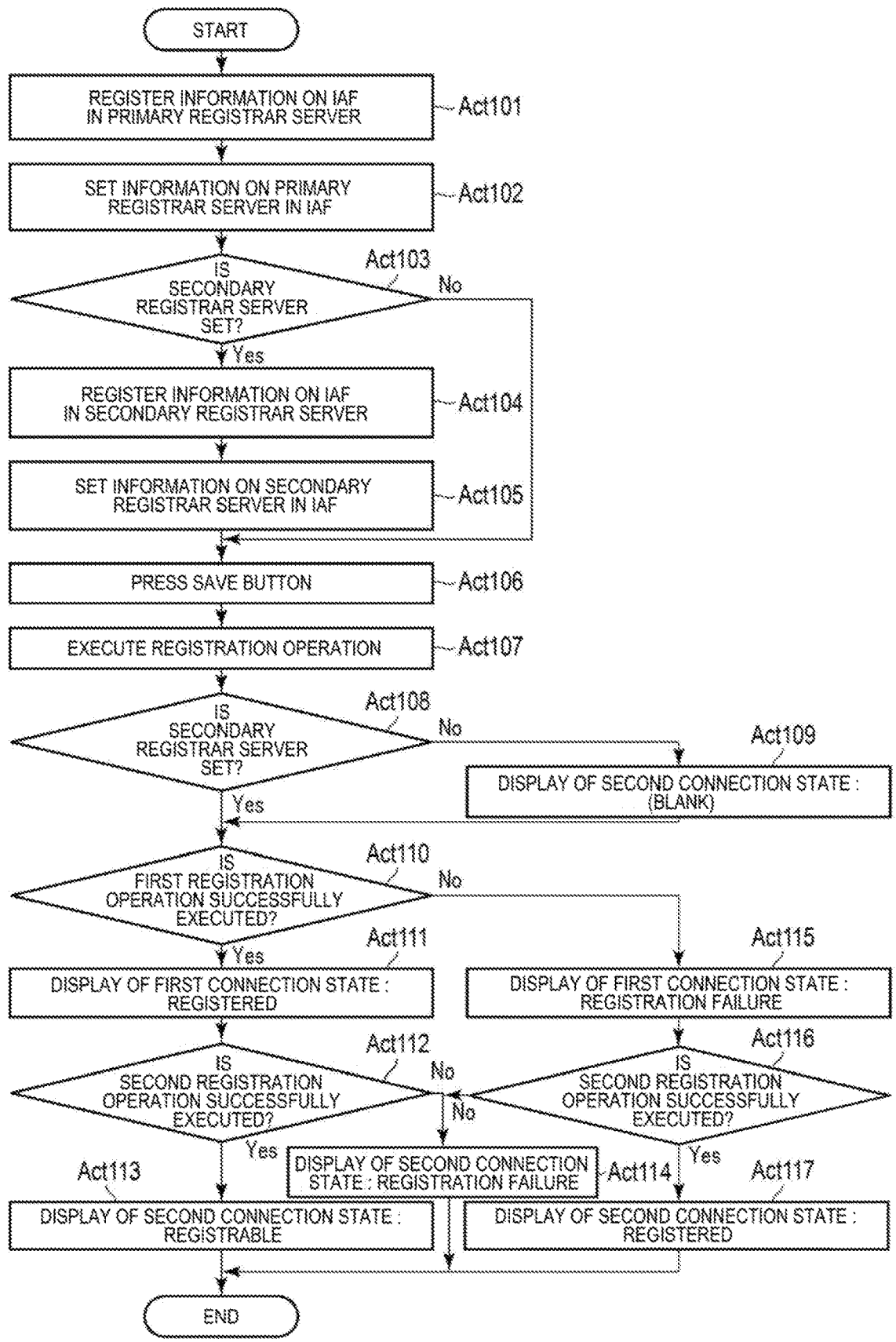
FIG. 14 is a flowchart illustrating displaying of statuses of connection states in the PC.

FIG. 14 is a flowchart illustrating displaying of the statuses of the first connection state and the second connection state in the PC 4. Here, the IAF device 1-1 may be used, for example.

The processor 41 registers the information on the IAF 1-1 with the primary registrar server 21 based on user operation (Act 101). Therefore, the user may acquire the information on the primary registrar server 21. The processor 41 sets the information on the primary registrar server 21 for the IAF device 1-1 based on user operation on the setting screen (Act 102). The setting screen is displayed on the display unit 46 by the first display control unit 411. When the information on the primary registrar server 21 is set (Act 103, Yes), the processor 41 processes Act 104. In Act 104, the processor 41 registers the information on the IAF 1-1 with the secondary registrar server 31 based on user operation. Therefore, the user may acquire the information on the secondary registrar server 31. The processor 41 sets the information on the secondary registrar server 31 for the IAF device 1-1 based on user operation on the setting screen (Act 105). The output unit 412 detects pressing of the save button by the user (Act 106). When the information on the primary registrar server 21 is not set (Act 103, No), the processor 41 processes Act 106.

The output unit 412 outputs the operation instruction including execution of the first registration operation and execution of the second registration operation to the IAF device 1-1 (Act 107). Therefore, the IAF device 1-1 executes the first registration operation and the second registration operation. The PC 4 receives information indicating whether the first registration operation is successfully executed from the IAF device 1-1, as a response to the operation instruction. The PC receives information indicating whether the second registration operation is successfully executed from the IAF device 1-1, as a response to the operation instruction. The second display control unit 413 determines the statuses of the first connection state and the second connection state based on the information set on the setting screen and whether the first registration operation and the second registration operation are successfully executed.

The second display control unit 413 determines whether the information on the secondary registrar server 31 is set on the setting screen (Act 108). When the information on the secondary registrar server 31 is not set (Act 108, No), the second display control unit 413 displays the status of the second connection state (Act 109). In Act 109, the second display control unit 413 displays "(blank)" on the setting screen as the status of the second connection state. When the information on the secondary registrar server 31 is set (Act 108, Yes), the second display control unit 413 determines whether the first registration operation is successfully executed (Act 110). When the first registration operation is successfully executed (Act 110, Yes), the second display control unit 413 displays the status of the first connection state (Act 111). In Act 111, the second display control unit 413 displays "registered" on the setting screen as the status of the first connection state.

The second display control unit 413 determines whether the second registration operation is success fully executed (Act 112). When the second registration operation is successfully executed (Act 112, Yes), the second display control unit 413 displays the status of the second connection state (Act 113). In Act 113, the second display control unit 413 displays "registrable" on the setting screen as the status of the second connection state. When the second registration operation fails (Act 112, No), the second display control unit 413 displays the status of the second connection state (Act 114). In Act 114, the second display control unit 413 displays "registration failure" on the setting screen as the status of the second connection state.

When the first registration fails (Act 110, No), the second display control unit 413 displays the status of the first connection state (Act 115). In Act 115, the second display control unit 413 displays "registration failure" on the setting screen as the status of the first connection state.

The second display control unit 413 determines whether the second registration operation is successfully executed (Act 116). When the second registration operation is successfully executed (Act 116, Yes), the second display control unit 413 displays the status of the second connection state (Act 117). In Act 117, the second display control unit 413 displays "registered" on the setting screen as the status of the second connection state. When the second registration operation fails (Act 116, No), the second display control unit 413 displays the status of the second connection state (Act 114). In Act 114, the second display control unit 413 displays "registration failure" on the setting screen as the status of the second connection state.

According to the present embodiment, the display 4 displays the first connection state and the second connection state on the display unit 46 based on pressing of the save button on the setting screen. Therefore, the PC 4 may provide the user with information indicating whether there is an error in the information on the registrar server set on the setting screen and whether each registrar server successfully registers the IAF 1-1. The user can easily confirm whether each registrar server successfully registers the IAF 1-1. Thus, the user can easily recognize presence/absence of errors in the information on the registrar server set on the setting screen. Since the user does not need to test data transmission and reception using each of the plurality of SIP servers in order to check whether the IAF 1-1 is successfully registered, the workload of the user is reduced.

In addition, although the PC is described as an example of the information processing apparatus in the present embodiment, the embodiment is not limited thereto. The information processing apparatus may be realized by the IAF 1-1. In this case, the IAF 1-1 includes a first display control unit, an output unit and a second display control unit installed therein. The first display control unit displays the setting screen on the display unit 16 of the IAF 1-1. The output unit outputs the operation instruction to each unit of the IAF 1-1. The second display control unit displays the first connection state and the second connection state on the display unit 16 of the IAF 1-1.

While certain embodiments have been described, these embodiments have been presented byway of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An information processing apparatus for displaying registration information of terminals on servers, comprising:
    a display device;
    an interface configured to receive:
        first registration information about a primary server, and
        second registration information about a secondary server; and
    a processor configured to:
        set the primary server for a terminal using the first registration information,
        execute a registration operation associated with the terminal,
        control the display device to display a connection state between the primary server and the terminal,
        control the display device to display a blank connection state indicating an absence of the secondary server if the secondary server has not been set for the terminal, and
        set the secondary server for the terminal using the second registration information.

2. The apparatus of claim 1, wherein the processor is configured to control the display device to display the connection state as registered indicating the secondary server is set and a connection between the primary server and the terminal is successful.

3. The apparatus of claim 1, wherein the processor is configured to control the display device to display the connection state as not successful indicating the secondary server is set and a connection between the primary server and the terminal is not successful.

4. The apparatus of claim 1, wherein the processor is configured to control the display device to display a registered connection state indicating the connection between the secondary server and the terminal is successfully executed.

5. The apparatus of claim 1, wherein the processor is configured to control the display device to display a connection state as registration failure indicating the connection between the secondary server and the terminal is not successfully executed.

6. The apparatus of claim 1, wherein the interface is an user interface for a user to input the first registration information about the primary server and the second registration information about the secondary server.

7. The apparatus of claim 1, wherein the terminals are internet aware fax (IAF) terminals.

8. The apparatus of claim 1, wherein the servers are session initiation protocol (SIP) servers.

9. A non-transitory computer readable medium storing program instructions for displaying registration information of terminals on servers, the instructions causing one or more processors to:
    receive first registration information about a primary server;
    receive second registration information about a secondary server;
    control a display device to display a visual representation;
    set the primary server for a terminal using the first registration information,
    execute a registration operation associated with the terminal,
    control the display device to display a connection state between the primary server and the terminal,
    control the display device to display a connection state as blank indicating an absence of the secondary server if the secondary server has not been set for the terminal, and
    set the secondary server for the terminal using the second registration information.

10. The non-transitory computer readable medium of claim 9, wherein the instructions further cause the one or more processors to control the display device to display the connection state as registered indicating the secondary server is set and a connection between the primary server and the terminal is successful.

11. The non-transitory computer readable medium of claim 9, wherein the instructions further cause the one or more processors to control the display device to display the connection state as not successful indicating the secondary server is set and a connection between the primary server and the terminal is not successful.

12. The non-transitory computer readable medium of claim 9, wherein the instructions further cause the one or more processors to control the display device to display a registered connection state indicating the connection between the secondary server and the terminal is successfully executed.

13. The non-transitory computer readable medium of claim 9, wherein the instructions further cause the one or more processors to control the display device to display a connection state as registration failure indicating the connection between the secondary server and the terminal is not successfully executed.

14. The non-transitory computer readable medium of claim 9, wherein the first registration information about the primary server and the second registration information about the secondary server is received from a user as an input to the one or more processors.

15. The non-transitory computer readable medium of claim 9, wherein the terminals are internet aware fax (IAF) terminals.

16. The non-transitory computer readable medium of claim 9, wherein the servers are session initiation protocol (SIP) servers.

* * * * *